US008244640B2

(12) United States Patent
Venkatachalam et al.

(10) Patent No.: US 8,244,640 B2
(45) Date of Patent: Aug. 14, 2012

(54) PACKET SCHEMA FOR PAY-AS-YOU-GO SERVICE PROVISIONING

(75) Inventors: Rajagopal Venkatachalam, Redmond, WA (US); Zhangwei Xu, Redmond, WA (US); Zeyong Xu, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 11/766,598

(22) Filed: Jun. 21, 2007

(65) Prior Publication Data

US 2008/0319908 A1 Dec. 25, 2008

(51) Int. Cl.
*G06F 21/00* (2006.01)

(52) U.S. Cl. .............. 705/51; 705/50; 705/52; 713/160; 370/473

(58) Field of Classification Search .............. 705/50–79; 713/160; 370/473
See application file for complete search history.

(56) References Cited

U.S. PATENT DOCUMENTS

| | | | | |
|---|---|---|---|---|
| 5,638,448 | A | 6/1997 | Nguyen | |
| 5,896,383 | A | 4/1999 | Wakeland | |
| 6,047,002 | A | 4/2000 | Hartmann et al. | |
| 6,804,776 | B1 | 10/2004 | Lothberg et al. | |
| 6,940,807 | B1 | 9/2005 | Rezvani et al. | |
| 2002/0051465 | A1 | 5/2002 | Fang et al. | |
| 2004/0160984 | A1 | 8/2004 | Sidhushayana et al. | |
| 2005/0094640 | A1* | 5/2005 | Howe | 370/395.1 |
| 2006/0107335 | A1* | 5/2006 | Frank et al. | 726/27 |
| 2006/0294020 | A1* | 12/2006 | Pence et al. | 705/59 |
| 2007/0005786 | A1* | 1/2007 | Kumar et al. | 709/230 |

FOREIGN PATENT DOCUMENTS

| | | |
|---|---|---|
| EP | 1659530 | 5/2006 |
| EP | 1659530 A1 | 5/2006 |
| WO | WO 2007-032973 | 3/2007 |
| WO | WO-2007032973 A1 | 3/2007 |

OTHER PUBLICATIONS

"Bluetooth Baseband", http://www.palowireless.com/infotooth/tutorial/baseband.asp.

Day, E., "The Use of ASN.1 Encoding Rules for Binary XML," http://www.obj-sys.com/docs/ASN1forBinXML.pdf.

"Plesk API RPC Packet Structure," http://download1.swsoft.com/Plesk/Plesk8.0/Doc/plesk-8-api-rpc/28722.htm.

Risso et al., "NetPDL: An extensible XML-based language for packet header description," http://www.sciencedirect.com/science?_ob=ArticleURL&_udi=B6VRG-4GSJ7W7-5&_user=10&_coverDate=04%2F06°2F2006&_rdoc=1&_fmt=&_orig=search&_sort=d&view=c&_acct=C000050221&_version=1&_urlVersion=0&_userid=10&md5=dfe2b16ee17ec38fc2ebf8c463786b42.

(Continued)

*Primary Examiner* — Chrystina Zelaskiewicz

(57) ABSTRACT

Methods and a program of instruction provide a packet schema framework for communication between elements of a pay-as-you-go business model including a provisioning server, an adapted electronic device, and a service provider. The packet schema defines provisioning instructions and content types to support service provisioning, including electronic device configuration and state, time-metering, and other types of functional and administrative tasks as well as to provide a foundation for any future messages needed for product evolution. The schema also defines security at multiple levels to guard against malicious users who may try to hook into the system to fraudulently use and/or configure the electronic devices for their own use and gain.

5 Claims, 8 Drawing Sheets

OTHER PUBLICATIONS

Ott et al., "XML-based Semantic Multicast Routing: An Overlay Network Architecture for Future Information Services," IEEE, 2004, http://ieeexplore.ieee.org/iel5/9481/30079/01378261.pdf?tp=&is number=30079&arnumber=1378261.

Written Opinion for PCT/US2008/067529 mailed Oct. 30, 2008.

International Search Report for PCT/US2008/067529 mailed Oct. 30, 2008.

International Search Report, PCT/US2008/067529, Oct. 30, 2008.

* cited by examiner

PACKET SCHEMA FOR PAY-AS-YOU-GO SERVICE PROVISIONING

BACKGROUND

Pay-as-you-go business models have been used in many areas of commerce, from cellular telephones to commercial laundromats. In developing a pay-as-you go business, a provider, for example, a cellular telephone provider, offers the use of hardware (a cellular telephone) at a lower-than-market cost in exchange for a commitment to remain a subscriber to their network for a period of time. In this specific example, the customer receives a cellular phone for little or no money in exchange for signing a contract to become a subscriber for a given period of time. Over the course of the contract, the service provider recovers the cost of the hardware by charging the consumer for using the cellular phone. In addition to implementing the pay-as-you-go business model via subscriptions, another implementation of the pay-as-you-go business model allows the customer to pre-pay for a block of service units, i.e., "pay-per-use." Using the cellular phone example, the customer may pre-pay for a block of 300 minutes. At the end of the 300 minutes, the customer may purchase additional blocks of service time or may return the phone to the service provider. The service provider may then contract out the phone to a different user.

The pay-as-you-go business model may incorporate a model of perpetual ownership. As part of a user agreement or contract, a service provider may allow the customer to take full unfettered ownership of the device after certain contractual conditions have been met. For example, the customer may take perpetual ownership of the device after a subscription period of so many years, or after having purchased so many blocks of service units. At the time of perpetual ownership, the service provider may turn off or disable pay-as-you-go features in the device and the customer may take possession of the device in a non-pay-as-you-go configuration.

The pay-as-you-go business model is predicated on the concept that the hardware provided has little or no value, or use, if disconnected from the service provider. To illustrate, should the subscriber mentioned above cease to pay his or her bill or the pay-per-use customer does not purchase additional blocks of time, the service provider deactivates the account, and while the cellular telephone may power up, calls cannot be made because the service provider will not allow them. The deactivated phone has no "salvage" value, because the phone will not work elsewhere and the component parts are not easily salvaged nor do they have a significant street value. In most cases, however, even though the phone has been deactivated it is still capable of connecting to the service provider in order to arrange restoration of the account. When the account is brought current, the service provider will re-authorize the device on its network and allow calling.

This model works well when the service provider, or other entity taking the financial risk of providing subsidized hardware, is able to enforce the terms of the contract as above. Because an electronic device, such as a computer, may have useful functions even when not connected to a network or server, a pay-as-you-go device may be responsible to self-administer contract enforcement. When the electronic device is responsible for self administration, a clock circuit may become a prime target for tampering because many business models are time based. For example, a subscription good for one calendar month may never expire if the clock is tampered with to keep the time within the valid month.

The communication between entities in the pay-as-you-go system requires a unified schema to support the various forms of packets. The schema needs to be elegant and robust to support provisioning, metering, and other types of configuration messages as well as to provide a foundation for any future messages needed for product evolution. The schema also needs to have security at multiple levels to guard against malicious users who may try to hook into the system to fraudulently use and/or configure the electronic devices for their own use and gain.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system supporting pay-as-you-go electronic devices requires that all communication from the electronic devices include the current time at the electronic device initiating the communication. The communication may be a request to add value to a timed usage or subscription account. If the current time at the electronic device is not within an allowable limit, a response message may include an updated time. The original request may be deferred or denied until the electronic device communicates a message with an acceptable current time. If repeated communications from the electronic device contain invalid current times, the electronic device in question may be blocked from being sent further responses until an appropriate service action may be taken to determine if tampering or a hardware failure have occurred.

If the current time at the electronic device is within the allowable limit, processing may proceed normally. To discourage fraudulent messages, application-level security may be applied to communications by encrypting and signing messages between a secure module in the electronic device and a trusted server. The trusted server may also communicate other information to the electronic device, such as how to configure to enforce terms of a service contract, any changes to contract terms, if the end-user has fulfilled the ownership requirements and has unfettered use of the electronic device, if the end-user has returned the electronic device back to the service provider and the device is not associated with any end-user, and other such provisioning information. Additionally, the service provider may also communicate with the electronic device locally to (re)configure the pay-as-you-go configuration (e.g., after end-user A has ended his/her contract and turned in the device and before it is contracted out to end-user B) or to disable pay-as-you-go altogether (e.g., if the service provider wishes to sell the electronic device in a non-pay-as-you-go mode).

Methods and a program of instruction for communicating between elements in a pay-as-you-go system may utilize a provisioning packet schema. This packet schema may be used for defining the communication from a provisioning server to an electronic device adapted for use in a pay-as-you-go system by the addition of a local provisioning system, from the electronic device to the provisioning server, or from a local service provider to the electronic device. The packet schema may take the form of a four-level schema, and may comport with XML, TLV, other such languages or combinations thereof.

The first level of the four level schema may contain the actual packet content data to be consumed by an entity in the pay-as-you-go system and additional administrative information such as but not limited to: pre-paid card/subscription, sender, sequence and tracking identifiers; creation date; conversation thread sequence numbers; and the like. The packet content data may consist of a provisioning instruction with a specific content type and any other additional data needed to process that specific content type. Examples of content types may include information from the provisioning server to the electronic device adapted for use in a pay-as-you-go environment such as an indication of the contract type and length (whether pre-paid or subscription), an indication that the end-user has fulfilled the contract obligations and fully owns the electronic device, an indication that the end-user has returned the electronic device to the service provider and provisioning needs to be suspended until the next end-user, and a desired configuration of metering and other electronic device behavior to enforce contract terms. Other content types and their associated fields are also possible.

For communication generated at an electronic device adapted for use in a pay-as-you-go environment, the packet schema may define a request content type that may contain information on the metering state, last sequence number, platform and software version indicators, pay-as-you-go contract balance, debugging code fields and state information. The packet schema may also define the packet content data received and interpreted by the electronic device. These content types may include all of the aforementioned provisioning instruction content types able to be generated by the provisioning server, as well as provisioning instructions able to be generated locally by the service provider, including but not limited to an indication to disable local service provisioning and an indication of the desired pay-as-you-go configuration.

The second level of the four level schema may contain the packet content of the first level, a version identifier of the schema, and a signature which may be RSA or may be another public-key encryption algorithm. The security at the second level may ensure that the packet content data is signed by the required source.

The third level of the four level schema may contain the encrypted data of the first and the second layers to prevent the communicated packet data from being exposed. Additional security may be provided by including the sender's identifier and the session identifier for use as keys to decrypt the data.

The fourth level of the four level schema may contain the data of the first three levels, the version of the schema, and a hash to prevent tampering. The hash may use a MAC (message authentication code) for the first, second, and third layers, or it may use another cryptographic hashing mechanism to authenticate the message.

DRAWINGS

Figure 4:
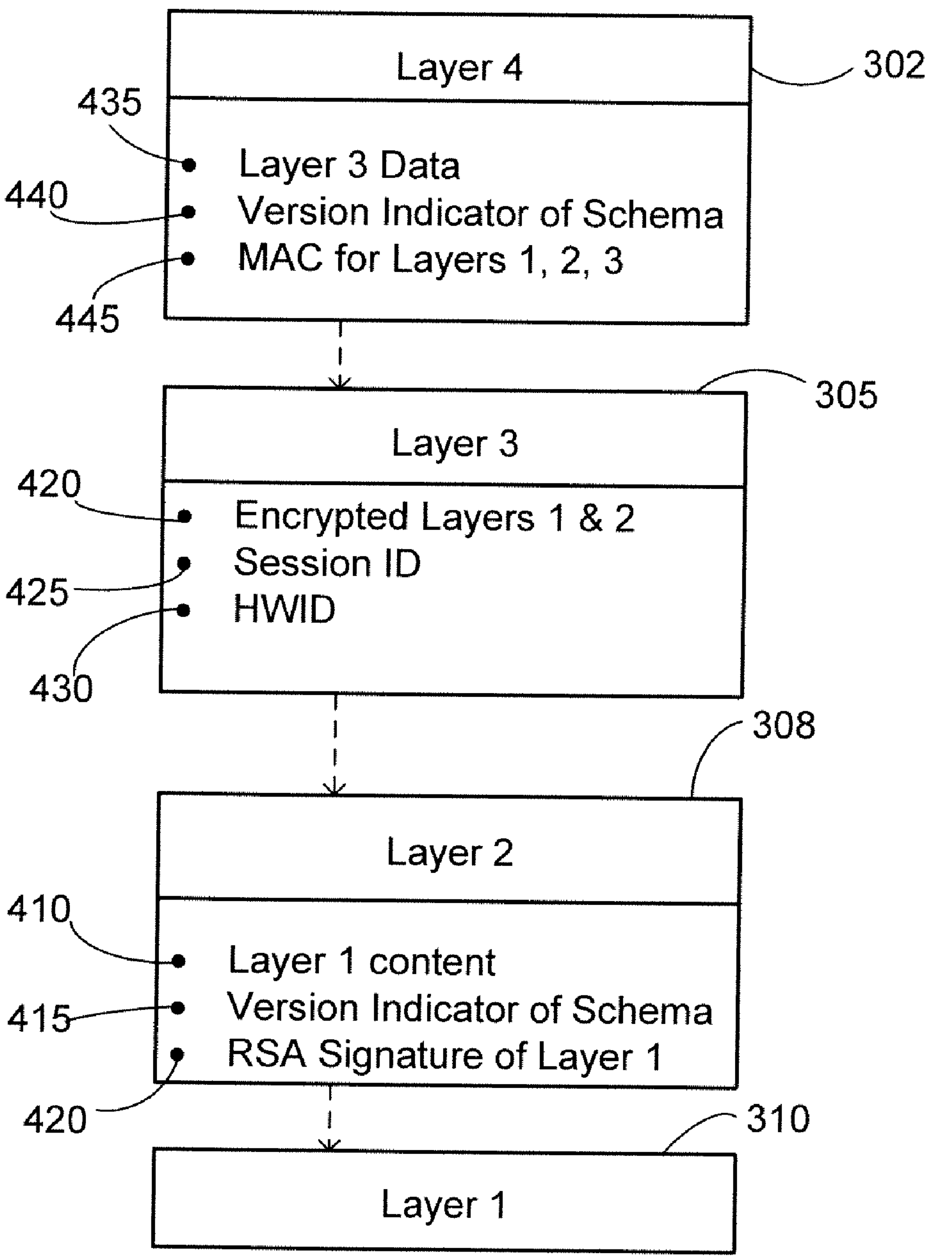
FIG. 4 illustrates details of other layers in the packet schema shown in FIG. 3.
Figure 4A:
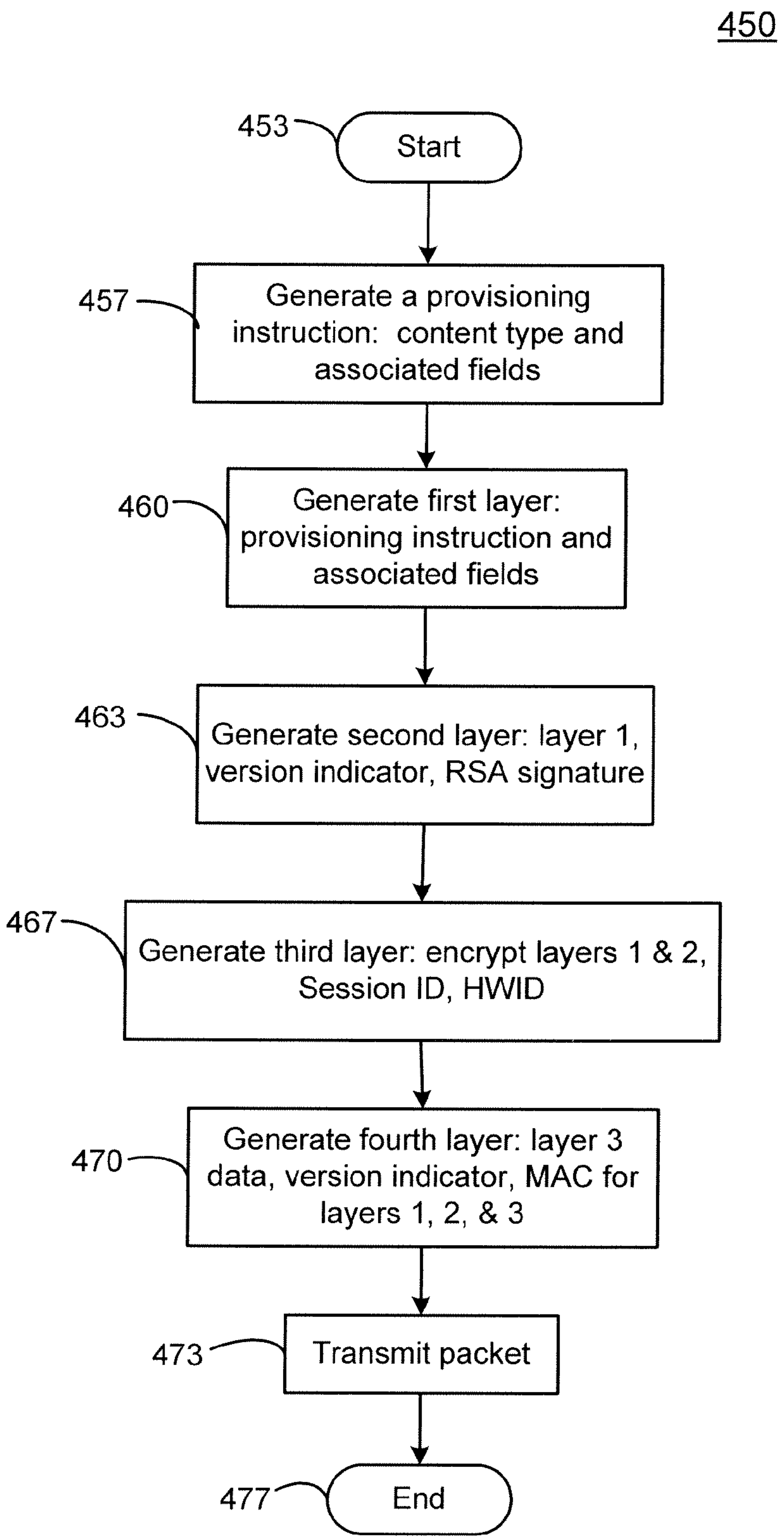
Figure 5:
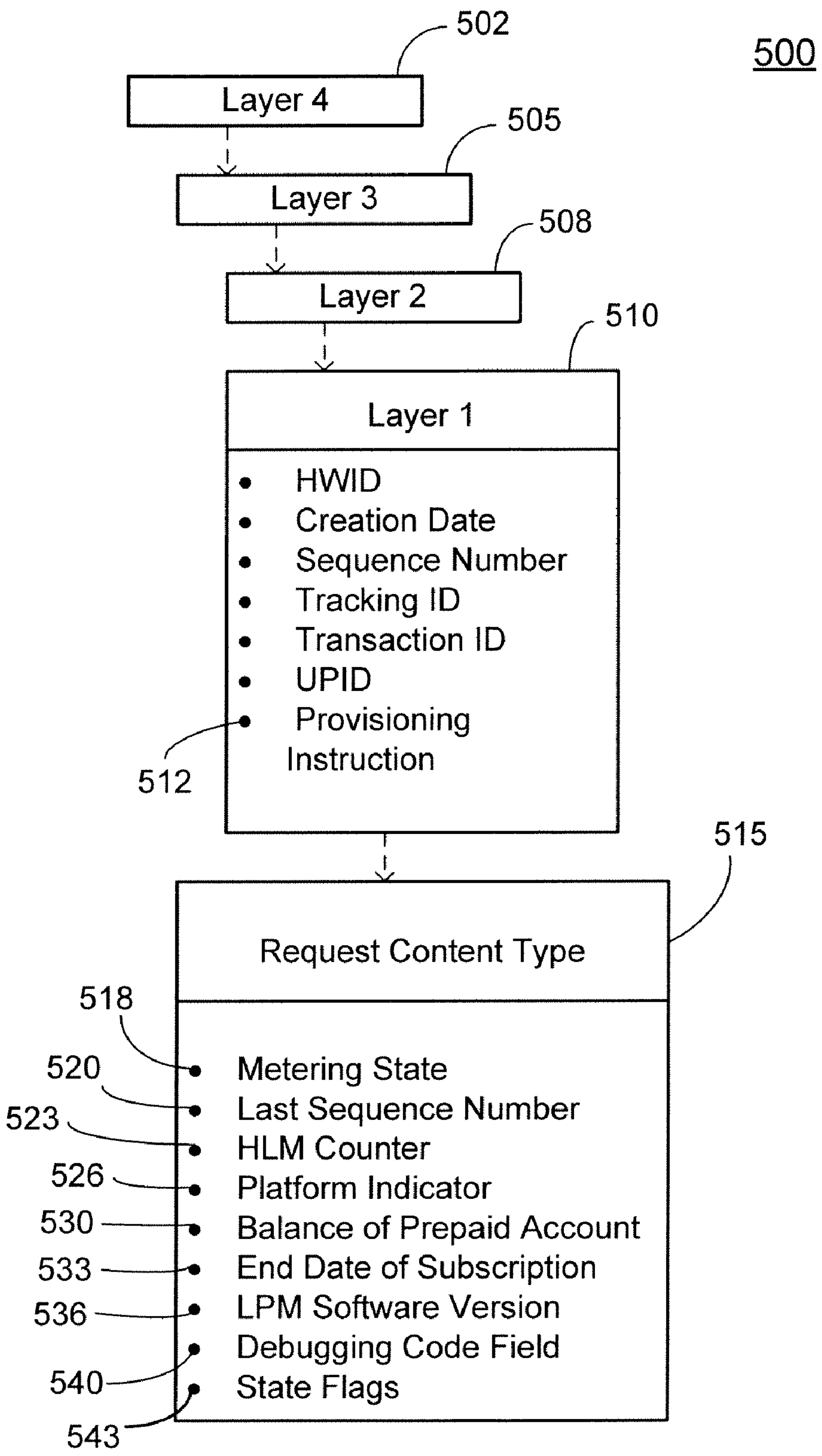
Figure 6:
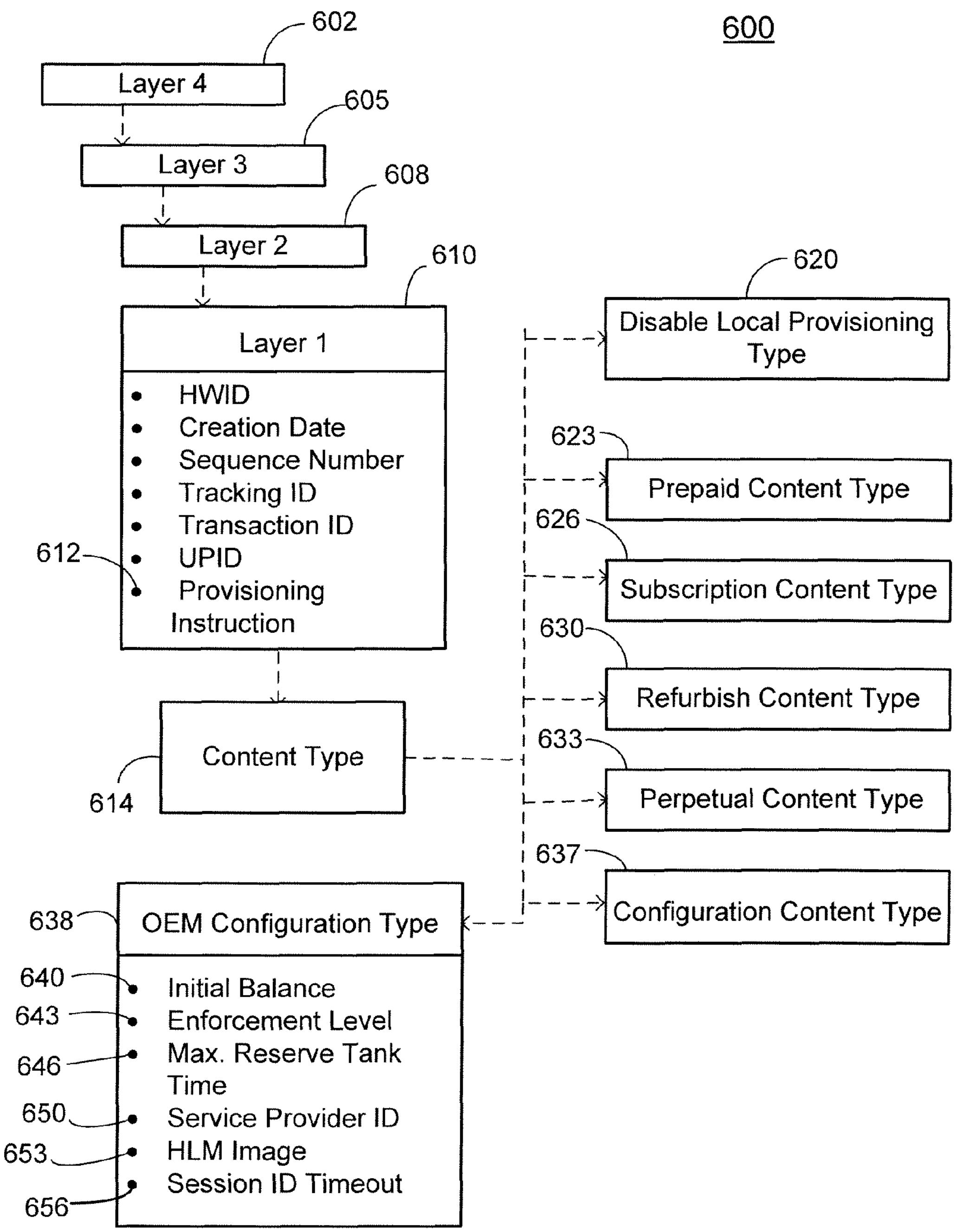
Figure 7:
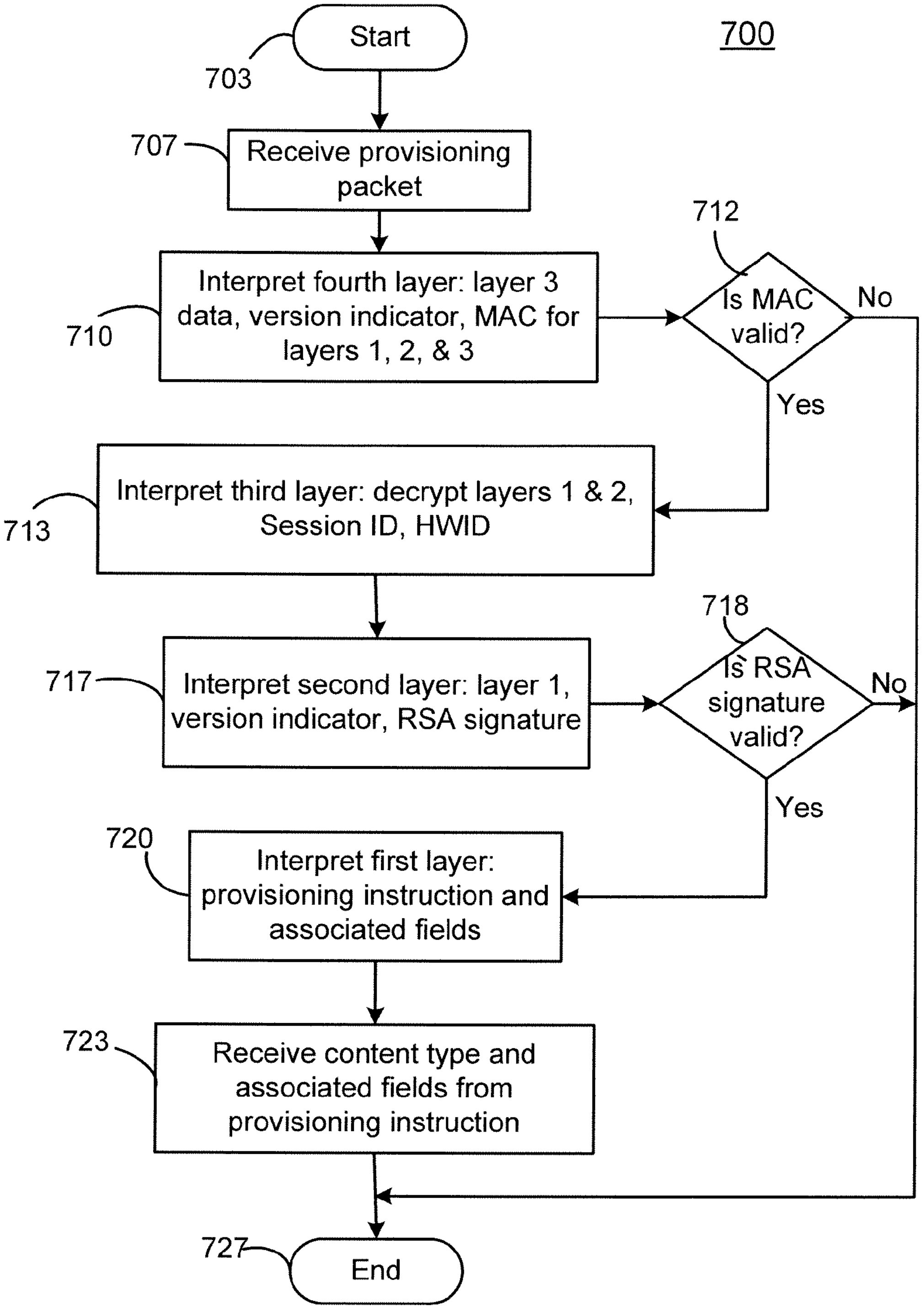

FIG. 4*a* describes a method for communicating between a provisioning server system and an electronic device in a pay-as-you-go system;

FIG. 5 illustrates a packet-defining schema that may be generated by an electronic device adapted for use in a pay-as-you-go system;

FIG. 6 illustrates a packet-defining schema that may be received at an electronic device adapted for use in a pay-as-you-go system, and FIG. 7 shows a method for receiving a provisioning packet in a pay-as-you-go system.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '__________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Many prior-art high-value computers, personal digital assistants, organizers, and the like, are not suitable for use in a pre-pay or pay-for-use business model as is. The device must be adapted to support the business model by having the ability to meter time, enforce contract conditions, communicate with a provisioning system, and other such behaviors. In the pay-as-you-go business model, a service provider owns the adapted physical device (computer, PDA, organizer, etc.) and enters into a contract or service agreement for device usage with an end-user. The service agreement may be a subscription with a fee to be paid at a regular interval, it may be a pre-paid card or account with a fixed amount of usage time that may be replenished by the end-user, or it may be some other similar pay-as-you-go arrangement. When certain terms of the service agreement have been fulfilled by the end-user (e.g., paid subscription over a pre-defined length of time or paid for a pre-defined number of minutes), the service provider may transfer full ownership of the device to the end-user and the device would enter a perpetual non-metered state for unfettered use.

The ability to enforce a contract requires a service provider, or other enforcement entity, to be able to affect a device's operation even though the device may not be connected to the service provider, e.g. connected to the Internet. A first stage of enforcement may include a simple pop up warning, indicating the terms of the contract are nearing a critical point. A second stage of enforcement, for example, after pay-per-use minutes have expired or a subscription period has lapsed, may be to present a system modal user interface for adding value and restoring service. A provider's ultimate leverage for enforcing the terms of a subscription or pay-per-use agreement is to disable the device. Such a dramatic step may be appropriate when it appears that the user has made a deliberate attempt to subvert the metering or other security systems active in the device.

Uses for the ability to place an electronic device into a limited function or hardware locked mode may extend beyond subscription and pay-per-use applications. For example, techniques for capacity consumption could be used for licensing enforcement of an operating system or individual applications.

Figure 1:
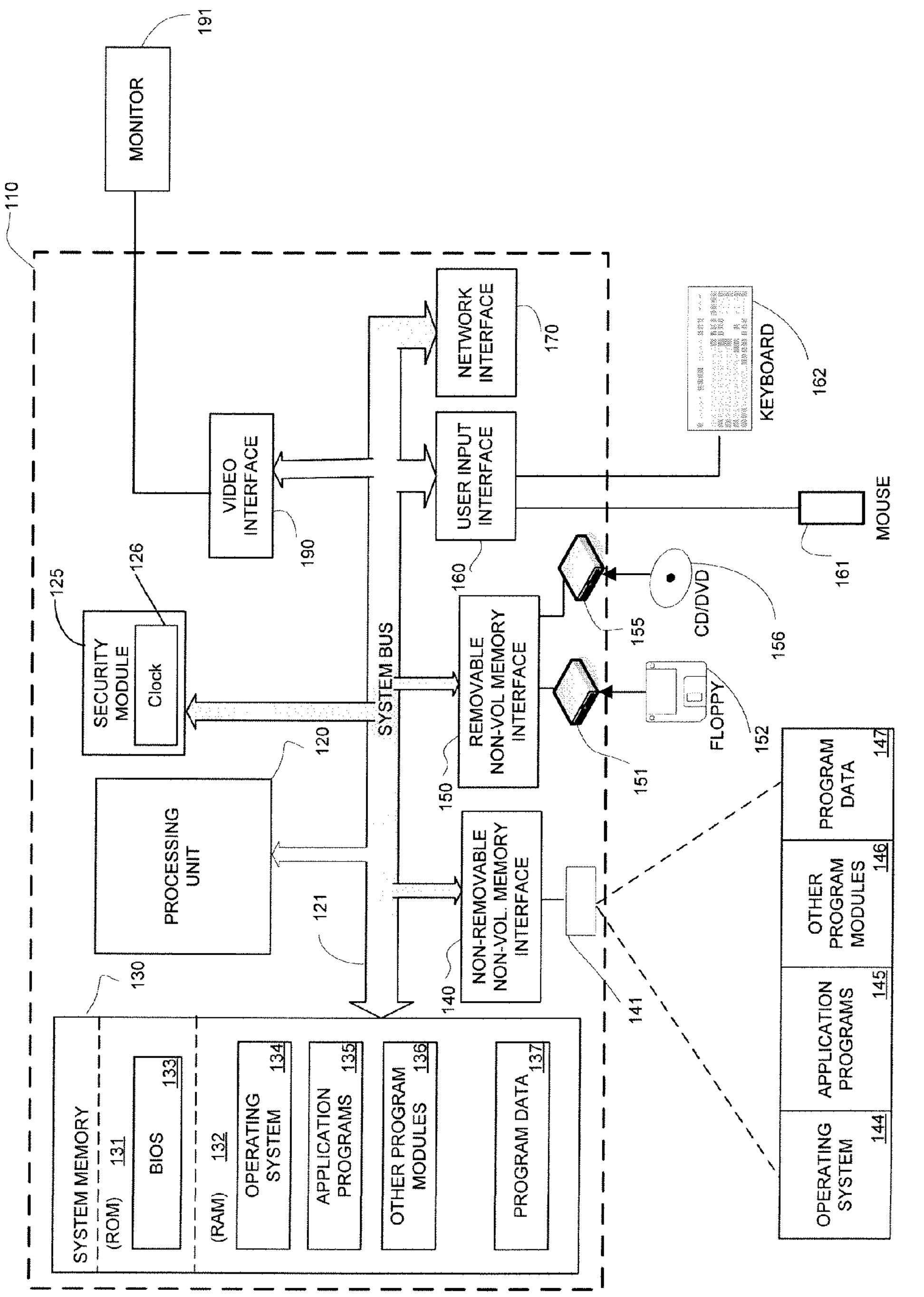
FIG. 1 is a block diagram of a computing system that may operate in accordance with the claims.

FIG. 1 illustrates a logical view of a computing device in the form of a computer 110 that may be used in a pay-per-use or subscription mode. For the sake of illustration, the computer 110 is used to illustrate the principles of the instant disclosure. However, such principles apply equally to other electronic devices, including, but not limited to, cellular telephones, personal digital assistants, media players, appliances, gaming systems, entertainment systems, set top boxes, and automotive dashboard electronics, to name a few. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, front side bus, and Hypertransport™ bus, a variable width bus using a packet data protocol.

The computer 110 may include a security module 125. The security module 125 may be enabled to perform security monitoring, pay-per-use and subscription usage management, and policy enforcement related to terms and conditions associated with paid use, particularly in a subsidized purchase business model. The security module 125 may be embodied in the processing unit 120, as a standalone component, or in a hybrid, such as a multi-chip module. A clock 126 may be incorporated into the security module 125 to help ensure tamper resistance. To allow user management of local time setting, including daylight savings or movement between time zones, the clock 126 may maintain its time in a coordinated universal time (UTC) format and user time calculated using a user-settable offset. The security module 125 may also include a cryptographic function (not depicted).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, digital camera, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190.

The computer 110 may operate in a networked environment using logical connections to one or more remote computers (not depicted) over a network interface 170, such as broadband Ethernet connection or other known network.

Figure 2:
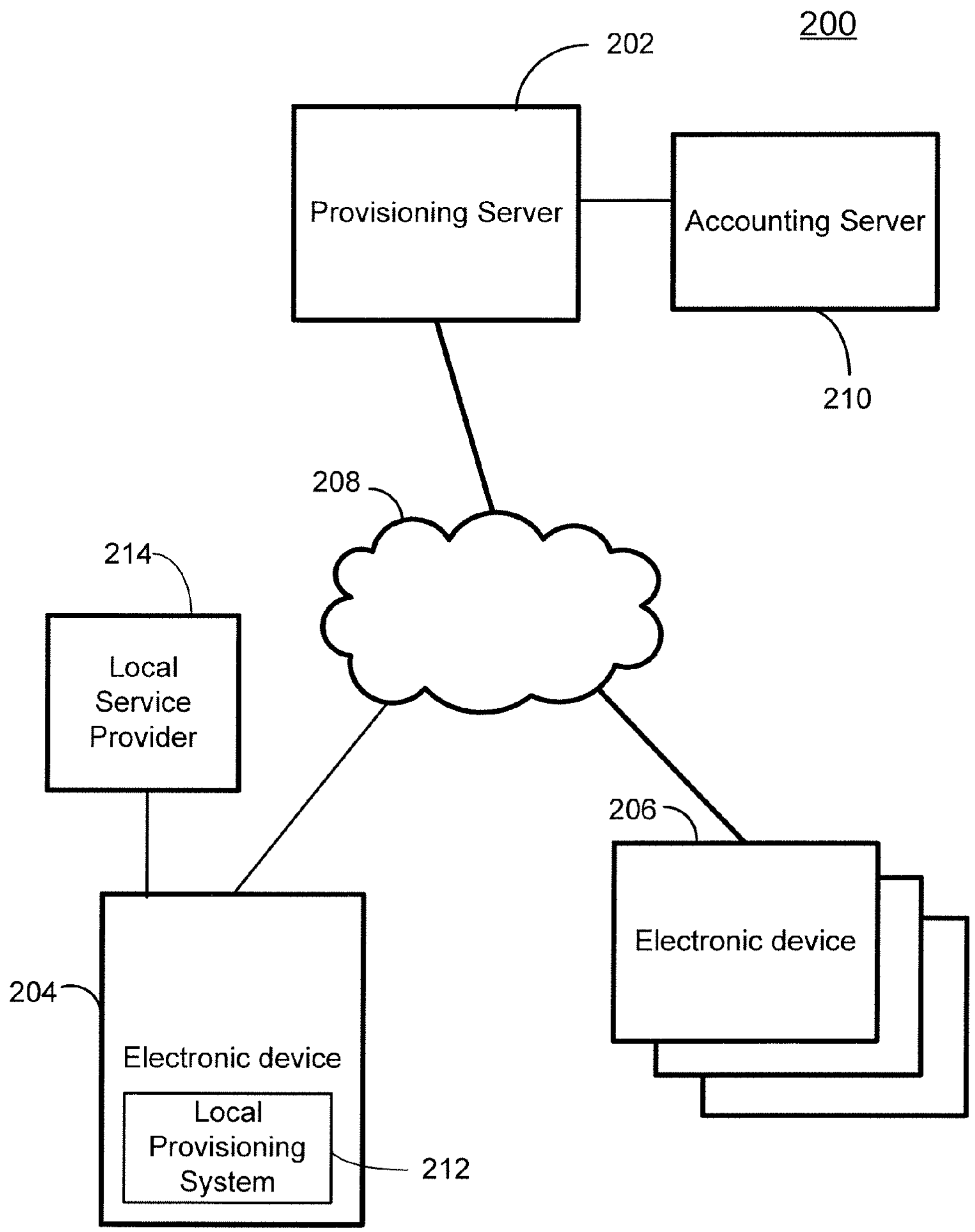
FIG. 2 is a simplified and exemplary block diagram of a system supporting a pay-as-you-go business model.

FIG. 2 is a simplified and exemplary block diagram of a system 200 supporting pay-as-you-go usage of a computer or other electronic device. A provisioning server 202 may serve as a trusted endpoint for provisioning requests from one or more electronic devices participating in the pay-as-you-go business ecosystem, and may be similar to the computer of FIG. 1. The provisioning server 202 may include the secure clock 126 of FIG. 1 adapted to support pay-as-you-go metering purposes. An electronic device 204 may be similar to the computer 110 of FIG. 1. The electronic device 204 may be configured for use in a pay-as-you-go system by including a local provisioning system 212 for metering time, enabling/disabling pay-as-you-go functionality, and communicating with the provisioning server 202. A secure clock 126 of computer 110 may reside in the local provisioning system 212 to assist with time metering. Other electronic devices 206 may perform substantially the same as the exemplary device 204. Communication between the provisioning server 202 and the electronic device 204 may be accomplished through a network 208 that may include landline, wireless, or broadband networks, or other networks known in the art.

An accounting server 210 may be linked to the provisioning server 202 and may maintain account data corresponding to the electronic device 204. The accounting server 210 may also serve as a clearinghouse for financial transactions related to the electronic device 204, such as replenishing or adding value to a pay-as-you-go account maintained on the electronic device 204. For example, an end-user may transfer funds to an account maintained on the accounting server 210 for use in an add-value or subscription transaction. The accounting server 210 itself may have a link to a scratch card system (not depicted) allowing the end-user to purchase a card at retail and use a hidden number to replenish his or her account. Other prepaid account funds transfer systems are well known, for example, with respect to prepaid cellular phones, and are equally applicable in this business model.

The architecture and functionality of the provisioning server 202 are discussed in detail in U.S. patent application Ser. No. 11/668,439. To paraphrase here for the reader's context, the provisioning server 202 may accept an authentication packet, or request, from an electronic device 204 206 adapted for use in a pay-as-you-go system and may determine whether to process the request or reply with related information or instructions. Operations of the electronic devices 204 206 adapted for use in a pay-as-you-go system are also discussed in more detail in U.S. patent application Ser. No. 11/668,439. Briefly, the metered-use electronic devices 204 206 may receive a packet from a provisioning server 202 through a network 208 that may include landline, wireless, or broadband networks, or other networks known in the art. The electronic devices 204 206 may also receive a packet/message from a local on-site service provider 214 via a USB, Ethernet, or other such connection known in the art. The electronic devices 204 206 may determine how and if to process the message, including potentially replying with a response. The packing and unpacking of packets/messages and related subsequent processing, actions, and responses are disclosed by U.S. patent application Ser. No. 11/668,439.

Figure 3:
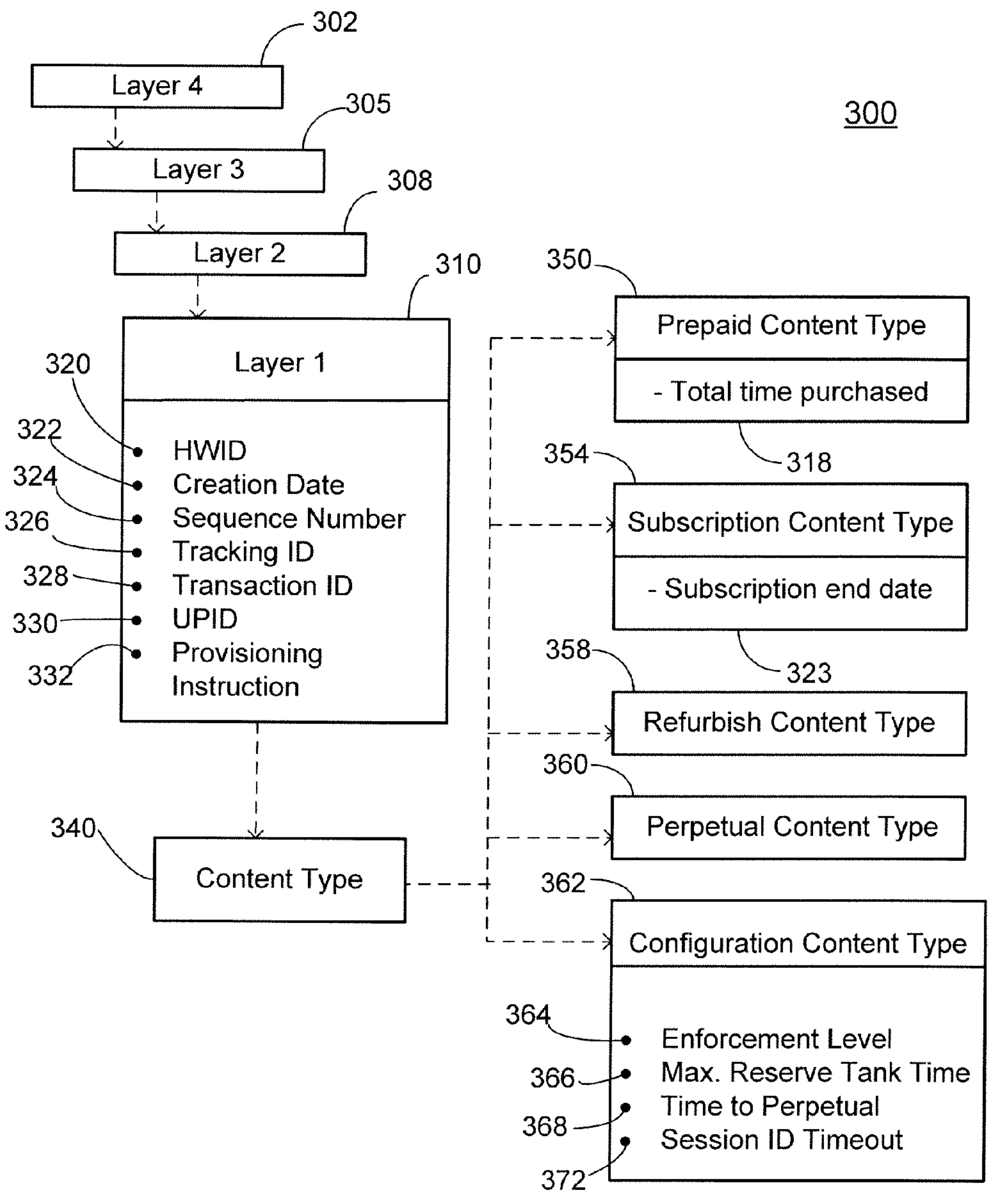
FIG. 3 illustrates a packet-defining schema that may be used for communicating from a provisioning system to an electronic device adapted for use in a pay-as-you-go system.

FIG. 3 illustrates an embodiment of a schema defining a provisioning packet 300 that may be used for communicating from a provisioning system 202 to an electronic device adapted for use in a pay-as-you-go system 204 206. The schema 300 may comport with a four-layer schema 302 305 308 310 which may be of the form XML (Extensible Mark-Up Language), TLV (Type-Length-Value), other languages commonly known in the art, or combinations thereof. The first layer 310 of the schema may contain one or more fields such as: the hardware identification (HWID) of the sender 320 which may be identification of the provisioning system 202 or may be identification of the electronic device 204 206, the creation date 322 of the packet, a sequence number 324 to keep track of the conversation between entities, a tracking identification 326 that may be implemented as a GUID (Globally Unique Identifier) or may be implemented with a different tracking identification mechanism, a transaction identification 328 that may contain an identifier of a pre-paid card purchased by the end-user or may contain a subscription identifier, an identification of the service provider for the electronic device 204 206 which may take the form of a universal product identifier (UPID) 330 or may take a different form, and a provisioning instruction 332. Of course, other additional fields may also be used to support communication between the provisioning server 202 and the electronic device 204 206.

The provisioning instruction 332 may have a content type 340. This content type 340 may be one of many different types with unique meanings. FIG. 3 illustrates the various content types that may be defined by the schema for provisioning packet 300, however, as stated above, the operations of the provisioning system 202 and the electronic device 204 206 with relation to the content types are disclosed by U.S. patent application Ser. No. 11/668,439. A pre-paid content type 350 may indicate the total time purchased 352 by the end-user using a scratch-off card, access code, or other such means. A subscription content type 354 may indicate that an end-user has paid for an interval of subscription time (which may be daily, monthly, etc.) and may further indicate the subscription end date 356. A refurbish content type 358 may indicate that a pay-as-you-go electronic device 204 206 has been returned to the service provider by an end-user and is temporarily in a dormant/inactive mode. A perpetual content type 360 may indicate that an end-user has fulfilled the criteria for ownership and has unlimited use of the pay-as-you-go electronic device 204 206.

A provisioning instruction 332 with a configuration content type 362 may indicate a desired configuration of the pay-as-you-go electronic device 204 206. The fields defining the desired configuration may include one or more of the following: an enforcement level 364 that may inform the local provisioning system 212 of desired action(s) (e.g., reboot, add grace time, etc.) to take when pay-as-you-go conditions expire, a maximum reserve tank time 366 to indicate a borrowed amount of time from a future pre-paid card or subscription purchase to use to when an end-user's pay-as-you-go conditions expire, an indication of time to perpetual ownership 368, and a session identification timeout value 372 to inform the local provisioning system 212 how to adjust a timeout value for a session. Other fields may also be included with configuration content type 362 to support configuring of the pay-as-you-go electronic device 204 206.

Of course, the range of content types 340 in the provisioning instruction 332 is not limited to the content types listed here, but may include other types to support necessary communication between a provisioning server 202 and an electronic device adapted for use in a pay-as-you-go system 204 206.

FIG. 4 illustrates the details of other levels of the schema defining the provisioning packet 300. The second layer 308 may contain the content of the first layer 410, an indicator of the schema version 415, and a signature of the first layer 420 to ensure the data is being signed by the required source. The signature 420 may be an RSA algorithm or it may be another public key encryption algorithm. The third layer 305 may contain an encryption of the first and second layers 420, a session identification 425, and a hardware identification (HWID) 435 of the sender. The fourth layer 302 may contain the third layer data 435, an indicator of the schema version 440, and a cryptographic hash function for the other three layers to prevent tampering. This cryptographic hash function may be a message authentication code (MAC) 445 or it may be another cryptographic hash algorithm commonly known in the art. Other embodiments of the packet schema are also possible.

FIG. 4*a* illustrates an embodiment of a method 450 for communicating between a provisioning server system 202 and an electronic device 206 that may comport with a four-level schema. At the start 453, a provisioning instruction is generated 457 which may contain a content type 340 and associated fields. The range of the content type 340 and associated fields may be a content type and fields as described by FIG. 3 and FIG. 5. Next, a first layer of a four-layer schema may be generated 460 that may contain the provisioning instruction and associated fields. A second layer may be generated 463 that may include the content of the first layer, a version indicator of the schema, and an RSA signature. A third layer may be generated 467 that may consist of an encryption of the first and second layers, a session identification value, and a hardware identification of the sender. The fourth layer may be generated 470 that may contain the third layer data, an indicator of the schema version, and a cryptographic hash function of the other three layers. Lastly, the provisioning packet may be transmitted 473, and the method may end 477. Of course, other embodiments of method 450 may be possible.

FIG. 5 shows an embodiment of a schema defining a provisioning packet 500 generated by an electronic device adapted for use in a pay-as-you-go system 204 206. The schema 500 may comport with a four-layer schema 502 505 508 510 which may be of the form XML (Extensible Mark-Up Language), TLV (Type-Length-Value), other languages commonly known in the art, or combinations thereof. The first layer 510 of the packet 500 may contain a provisioning instruction 512 and may also contain other fields (e.g., HWID, tracking ID, etc.) similar to those of packet 300. The provisioning instruction 510 may be of a request content type 515, and may additionally contain one or more of the following fields: a metering state 518 to signify the state of metering of the local provisioning system 212, a last sequence number 520 to keep track of the conversation between entities, a hardware lock mode counter 523 to indicate how many times the electronic device 204 206 has entered limited function or hardware locked mode, a platform indicator 526 to signify whether the local provisioning system 212 hardware or local provisioning system 212 software initiated the request content type 515 packet, a balance of time 530 if the pay-as-you-go conditions are implemented with a pre-paid account, the end date of the subscription 533 if the pay-as-you-go conditions are implemented with a subscription account, a software version indicator 536 for the local provisioning system 212, a debugging code field 540, and a set of state flags 543. As stated above, these summary of field definitions are to provide context; the operations of the provisioning system 202 and the electronic device 204 206 with relation to the fields defined by schema 500 are disclosed by U.S. patent application Ser. No. 11/668,439. Of course, other content types and other fields may also be defined by this schema 500 as needed to support packet/message communication generated by an electronic device adapted to operate in a pay-as-you-go environment.

FIG. 6 illustrates an embodiment of a provisioning packet schema 600 used by an electronic device adapted for use in a pay-as-you-go system 204 206 to interpret packets that it receives. The provisioning packet 600 may comport with a four-layer schema 602 605 608 610 which may take the form of XML (Extensible Mark-Up Language), TLV (Type-Length-Value), other languages commonly known in the art, or combinations thereof. The first layer 610 of the packet 600 may contain a provisioning instruction 612 and may also contain other fields (e.g., HWID, tracking ID, etc.) similar to those fields defined in packet 300 of FIG. 3. The provisioning instruction 612 may have a content type 614. This content type 614 may be one of many different types with unique meanings. FIG. 6 illustrates the various content types that may be defined by the schema for provisioning packet 600, however, as stated above, the operations of the provisioning system 202 and the electronic device 204 206 with relation to the content types are disclosed by U.S. patent application Ser. No. 11/668,439. A provisioning instruction 612 with a disable local provisioning content type 620 may be an indication to disable the local provisioning system 212 at the electronic device 204 206, for instance, when the service provider wishes to sell the electronic device 204 206 in a non-pay-as-you-go mode.

A pre-paid content type 623 may indicate that an end-user has purchased a set amount of time using a scratch-off card, access code, or other such means. A subscription content type 626 may indicate that an end-user has paid for an interval of subscription time (which may be daily, monthly, etc.) and may further indicate the expiration date of the subscription. A refurbish content type 630 may indicate that a pay-as-you-go electronic device 204 206 has been returned to the service provider by an end-user and is temporarily in a dormant/inactive mode. A perpetual content type 633 may indicate that an end-user has fulfilled the criteria for ownership and has unlimited use of the pay-as-you-go electronic device 204 206.

A provisioning instruction 612 with a configuration content type 637 may be interpreted as communicating a desired configuration of the pay-as-you-go electronic device 204 206. With the configuration content type 637, additional fields used to specify the desired configuration may be similar to those defined in packet 300 of FIG. 3, and may include one or more of the following: an enforcement level that may inform the local provisioning system 212 of desired action(s) (e.g., reboot, add grace time, etc.) to take when pay-as-you-go conditions expire, a maximum reserve tank time to indicate a borrowed amount of time from a future pre-paid card or future subscription extension to use to when an end-user's pay-as-you-go conditions expire, an indication of time to perpetual ownership, and a session identification timeout value to inform the local provisioning system how to adjust a timeout value for a session. Of course, other additional fields may also be used as needed.

A provisioning instruction 612 with an OEM configuration content type 638 may indicate a desired configuration of the electronic device adapted for a pay-as-you-go system 204 206. The fields defining the desired configuration may include one or more of the following: an initial balance of time 640, an enforcement level 643 that may inform the local provisioning system 212 of desired action(s) (e.g., reboot, add grace time, etc.) to take when pay-as-you-go conditions expire, a maximum reserve tank time 646 to indicate a borrowed amount of time from a future pre-paid card or subscription purchase to use to when an end-user's pay-as-you-go conditions expire, a service provider identification 650, a hardware lock mode image 653, and a session identification timeout value 656.

FIG. 7 illustrates an embodiment of a method 700 for receiving a provisioning packet 707 that may comport with a four-level schema. At the start 703, the fourth layer may be interpreted 710 as having the third layer data, a schema version indicator, and a message authentication code for the other three layers. If the MAC is validated successfully 712, the third layer may be interpreted 713. The third layer may contain an encryption of the first and second layers to be decrypted, a session identification value, and a hardware identification of the sender. The second layer may then be interpreted 717 that may include the content of the first layer, a version indicator of the schema, and an RSA signature. If the RSA signature is validated successfully 718, the first layer may be interpreted 720. The first layer may include a provisioning instruction and associated fields. A content type and associated fields may be obtained from the provisioning instruction 723, where the content type may be one of the types illustrated by FIGS. 5 and 6. When the provisioning packet has been interpreted in its entirety, the method 700 may end 727. Of course, other embodiments of method 700 may be possible.

An exemplary implementation of the packet schema may be represented by the following:

```
<?xml version="1.0" encoding="utf-8" ?>
<xs:schema xmlns:xs="http://www.w3.org/2001/XMLSchema" elementFormDefault="qualified"
attributeFormDefault="qualified">
Layer 1 : Payasyougo Packet Content
  <xs:complexType name="PrepaidContentType">
    <xs:sequence>
      <xs:element name="Minutes"      type="xs:int"   minOccurs="1" maxOccurs="1" />
      <xs:element name="TotalMinutesBought" type="xs:int"   minOccurs="1" maxOccurs="1" />
    </xs:sequence>
  </xs:complexType>
  <xs:complexType name="SubscriptionContentType">
    <xs:sequence>
      <xs:element name="EndDate"      type="xs:dateTime" minOccurs="1" maxOccurs="1" />
    </xs:sequence>
  </xs:complexType>
  <xs:complexType name="TimeSyncContentType">
    <xs:sequence>
      <xs:element name="UTCTime"      type="xs:dateTime" minOccurs="1"maxOccurs="1" />
    </xs:sequence>
  </xs:complexType>
  <xs:complexType name="RefurbishContentType">
    <xs:sequence>
      <xs:element name="Refurbish"      type="xs:string"   minOccurs="1" maxOccurs="1" />
    </xs:sequence>
  </xs:complexType>
  <xs:complexType name="PerpetualContentType">
    <xs:sequence>
      <xs:element name="Perpetual"      type="xs:string"   minOccurs="1" maxOccurs="1" />
    </xs:sequence>
  </xs:complexType>
  <xs:complexType name="ConfigurationContentType">
    <xs:sequence>
      <xs:element name="EnforcementLevel"      type="xs:int"   minOccurs="1" maxOccurs="1" />
      <xs:element name="MaxReserveTankTimeInMinutes" type="xs:int"   minOccurs="1" maxOccurs="1"
/>
      <xs:element name="SessionIDTimeoutInSeconds"   type="xs:int"   minOccurs="1" maxOccurs="1" />
      <xs:element name="MaxAllowedBitmapUpdates"     type="xs:int"   minOccurs="1" maxOccurs="1"
/>
      <xs:element name="TotalHoursToPerpetual"      type="xs:int"   minOccurs="1" maxOccurs="1" />
    </xs:sequence>
  </xs:complexType>
  <xs:complexType name="OEMConfigurationContentType">
    <xs:sequence>
      <xs:element name="EnforcementLevel"      type="xs:int"   minOccurs="1" maxOccurs="1" />
      <xs:element name="MaxReserveTankTimeInMinutes" type="xs:int"   minOccurs="1"
maxOccurs="1" />
      <xs:element name="MaxAllowedBitmapUpdates"   type="xs:int"   minOccurs="1" maxOccurs="1"
/>
      <xs:element name="SessionIDTimeoutInSeconds"   type="xs:int"   minOccurs="1" maxOccurs="1"
/>
      <xs:element name="InitialBalanceInMinutes"   type="xs:int"   minOccurs="1" maxOccurs="1" />
      <xs:element name="UPID"            type="xs:string"   minOccurs="1" maxOccurs="1" />
      <xs:element name="HLMImage"            type="xs:hexBinary" minOccurs="0" maxOccurs="1" />
    </xs:sequence>
  </xs:complexType>
  <xs:complexType name="PacketDownloadContentType">
    <xs:sequence>
      <xs:element name="PacketDownloadComplete"   type="xs:int"   minOccurs="1" maxOccurs="1" />
    </xs:sequence>
```

-continued

```
  </xs:complexType>
  <xs:complexType name=“DisableLPMContentType”>
    <xs:sequence>
      <xs:element name=“DisableLPM”      type=“xs:string” minOccurs=“1” maxOccurs=“1” />
    </xs:sequence>
  </xs:complexType>
  <xs:complexType name=“RequestContentType”>
    <xs:sequence>
      <xs:element name=“State”      type=“xs:int”   minOccurs=“1” maxOccurs=“1” />
      <xs:element name=“StateFlags”      type=“xs:int”   minOccurs=“1” maxOccurs=“1” />
      <xs:element name=“LSN”       type=“xs:int”   minOccurs=“1” maxOccurs=“1” />
      <xs:element name=“HLMCount”      type=“xs:int”   minOccurs=“1” maxOccurs=“1” />
      <xs:element name=“Platform”      type=“xs:string”   minOccurs=“1” maxOccurs=“1” />
      <xs:element name=“Minutes”      type=“xs:int”   minOccurs=“0” maxOccurs=“1” />
      <xs:element name=“EndDate”      type=“xs:dateTime”   minOccurs=“0” maxOccurs=“1” />
      <xs:element name=“BugCheckCode”   type=“xs:int”   minOccurs=“0” maxOccurs=“1” />
      <xs:element name=“PlatformID”   type=“xs:int”   minOccurs=“1” maxOccurs=“1” />
    </xs:sequence>
  </xs:complexType>
  <xs:element name=“PayasyougoPacketContent”>
    <xs:complexType>
      <xs:sequence>
        <xs:element name=“HWID”      type=“xs:string”  minOccurs=“0” maxOccurs=“1” />
        <xs:element name=“CreationDate” type=“xs:dateTime”  minOccurs=“1” maxOccurs=“1” />
        <xs:element name=“SequenceNumber” type=“xs:int”   minOccurs=“0” maxOccurs=“1” />
        <xs:element name=“TrackingID”   type=“xs:string”   minOccurs=“0” maxOccurs=“1” />
        <xs:element name=“TransactionID”  type=“xs:string”   minOccurs=“0” maxOccurs=“1” />
        <xs:element name=“UPID”       type=“xs:string”   minOccurs=“0” maxOccurs=“1” />
        <xs:element name=“LPMBuildNumber” type=“xs:string”   minOccurs=“0” maxOccurs=“1” />
        <!-- ========================================================= -->
        <!-- Packet type definitions                 -->
        <!-- ========================================================= -->
        <xs:element name=“PacketType” minOccurs=“1” maxOccurs=“1”>
        <xs:simpleType>
          <xs:restriction base=“xs:string”>
            <xs:enumeration value=“PREPAID__PROVISION__PACKET__TYPE”   />
            <xs:enumeration value=“SUBSCRIPTION__PROVISION__PACKET__TYPE” />
            <xs:enumeration value=“CONFIGURATION__PACKET__TYPE”      />
            <xs:enumeration value=“OEM__CONFIGURATION__PACKET__TYPE”      />
            <xs:enumeration value=“TIMESYNC__PACKET__TYPE”        />
            <xs:enumeration value=“REFURBISH__PACKET__TYPE”        />
            <xs:enumeration value=“PERPETUAL__PACKET__TYPE”        />
            <xs:enumeration value=“NO__MORE__PACKETS__PACKET__TYPE”      />
            <xs:enumeration value=“LPM__AUTHENTICATION__PACKET__TYPE”   />
            <xs:enumeration value=“DISABLE__LPM__PACKET__TYPE”      />
          </xs:restriction>
        </xs:simpleType>
        </xs:element>
        <xs:element name=“ContentChoice”>
          <xs:complexType>
            <xs:choice>
              <xs:element name=“PrepaidContent”      type=“PrepaidContentType” />
              <xs:element name=“SubscriptionContent”      type=“SubscriptionContentType” />
              <xs:element name=“TimeSyncContent”      type=“TimeSyncContentType” />
              <xs:element name=“RefurbishContent”      type=“RefurbishContentType” />
              <xs:element name=“PerpetualContent”      type=“PerpetualContentType” />
              <xs:element name=“ConfigurationContent”   type=“ConfigurationContentType” />
              <xs:element name=“OEMConfigurationContent” type=“OEMConfigurationContentType” />
              <xs:element name=“PacketDownloadContent” type=“PacketDownloadContentType” />
              <xs:element name=“LPMRequest”        type=“RequestContentType” />
              <xs:element name=“DisableLPMContent”      type=“DisableLPMContentType” />
            </xs:choice>
          </xs:complexType>
        </xs:element>
      </xs:sequence>
    </xs:complexType>
  </xs:element>
  <xs:element name=“PayasyougoPacket”>
    <xs:complexType>
      <xs:sequence>
        <xs:element name=“SchemaVersion”      type=“xs:int”      minOccurs=“1” maxOccurs=“1”
default=“2” />
        <xs:element name=“PacketContent”      type=“xs:hexBinary” minOccurs=“1” maxOccurs=“1” />
        <xs:element name=“Signature”      type=“xs:hexBinary” minOccurs=“0” maxOccurs=“1” />
      </xs:sequence>
    </xs:complexType>
  </xs:element>
</xs:schema>
```

-continued

```
Layer 2 : Payasyougo Packet
    <xs:element name="PayasyougoPacket">
    <xs:complexType>
      <xs:sequence>
        <xs:element name="SchemaVersion"    type="xs:int"    minOccurs="1" maxOccurs="1"
default="2" />
        <xs:element name="PacketContent"    type="xs:hexBinary" minOccurs="1" maxOccurs="1" />
        <xs:element name="Signature"    type="xs:hexBinary" minOccurs="0" maxOccurs="1" />
      </xs:sequence>
    </xs:complexType>
  </xs:element>
</xs:schema>
<?xml version="1.0" encoding="utf-8" ?>
<xs:schema xmlns:xs="http://www.w3.org/2001/XMLSchema" elementFormDefault="qualified"
attributeFormDefault="qualified">
Layer 3 : Payasyougo Protocol Packet Content
    <xs:element name="PayasyougoProtocolPacketContent">
    <xs:complexType>
      <xs:sequence>
        <xs:element name="HWID"    type="xs:string"    minOccurs="1" maxOccurs="1" />
        <xs:element name="SessionID"    type="xs:hexBinary"    minOccurs="1" maxOccurs="1" />
        <xs:element name="PayasyougoPacket"    type="xs:hexBinary"    minOccurs="1" maxOccurs="1"
/>
      </xs:sequence>
    </xs:complexType>
  </xs:element>
Layer 4 : Payasyougo Protocol Packet
  <xs:element name="PayasyougoProtocolPacket">
    <xs:complexType>
      <xs:sequence>
        <xs:element name="SchemaVersion"   type="xs:int"   minOccurs="1" maxOccurs="1"
default="2" />
        <xs:element name="MAC"    type="xs:hexBinary"    minOccurs="1" maxOccurs="1" />
        <xs:element name="ProtocolData"    type="xs:hexBinary"    minOccurs="1" maxOccurs="1" />
      </xs:sequence>
    </xs:complexType>
  </xs:element>
</xs:schema>
```

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A computer-readable storage medium tangibly embodying a program of instructions executable by a computer, the program of instructions comprising:

a packet schema that communicates with a pay-as-you go electronic device in a pay-as-you-go system, the pay-as-you go electronic device comprising a local provisioning system, wherein:

the packet schema defines one or more provisioning instructions comprising one or more of a prepaid content type, a subscription content type, a refurbish content type, a perpetual content type, a configuration content type, a request content type, a disable local provisioning type, or an original equipment manufacturer (OEM) configuration type, the OEM configuration type indicating a manufacturer-desired configuration of the pay-as-you-go electronic device;

the local provisioning system meters time, enables and disables the pay-as-you-go electronic device, and communicates with a provisioning server of the pay-as-you-go system including receiving provisioning instructions in packets defined by the packet schema;

wherein the packet schema is a four layer schema comprising at least one of XML (Extensible Markup Language) and TLV (Type-Length-Value):

a first layer of the packet schema comprises the provisioning instruction, wherein the provisioning instruction of the prepaid content type further comprises an indication of total time purchased;

a second layer of the packet schema comprises the first layer, a digital signature of the first layer, and a version indicator of the packet schema;

a third layer of the packet schema comprises an encryption of the first and second layers, a session identification, and an identification of a sender; and a fourth layer of the packet schema comprises the first, second, and third layers, a version indicator of the packet schema, and a message authentication code (MAC) of the first layer, the second layer, and the third layer, wherein the MAC comprises an encryption of the first layer, the second layer, and the third layer, and authenticates the three layers.

2. The computer-readable storage medium of claim 1, wherein the provisioning instruction of the subscription content type further comprises a subscription end date.

3. The computer-readable storage medium of claim 1, wherein the provisioning instruction of the configuration content type further comprises at least one of the fields from the group comprising: an enforcement level, a maximum reserve tank time, a time to perpetual value, and a session identification timeout value.

4. The computer-readable storage medium of claim 1, wherein the provisioning instruction of the request content type further comprises at least one of the fields from the group comprising: a metering state, a last sequence number, a hardware lock mode counter, a platform indicator, a balance of prepaid account, an end date of subscription, a local provisioning module software version indicator, a debugging code field, and a set of state flags.

5. The computer-readable storage medium of claim 1, wherein the provisioning instruction of the OEM configuration type further comprises at least one of the fields from the group comprising: an initial balance, an enforcement level, a maximum reserve tank time, a service provider identifier, a hardware lock mode image, and a session identification timeout value.

* * * * *